(12) United States Patent
Hall et al.

(10) Patent No.: US 10,382,531 B2
(45) Date of Patent: Aug. 13, 2019

(54) CONTROLLING A REMOTE DEVICE OVER A NETWORK

(71) Applicants: David R. Hall, Provo, UT (US); Mark Hall, Springville, UT (US); Craig Boswell, Draper, UT (US)

(72) Inventors: David R. Hall, Provo, UT (US); Mark Hall, Springville, UT (US); Craig Boswell, Draper, UT (US)

(73) Assignee: Sure-Fi Inc., Provo, UT (US)

( * ) Notice: Subject to any disclaimer, the term of this patent is extended or adjusted under 35 U.S.C. 154(b) by 219 days.

(21) Appl. No.: 15/362,026

(22) Filed: Nov. 28, 2016

(65) Prior Publication Data
US 2018/0007141 A1  Jan. 4, 2018

Related U.S. Application Data

(63) Continuation-in-part of application No. 15/198,384, filed on Jun. 30, 2016, now Pat. No. 9,967,883.

(51) Int. Cl.
H04L 29/08 (2006.01)
H04W 4/02 (2018.01)
H04W 52/36 (2009.01)
H04L 29/06 (2006.01)
H04W 52/28 (2009.01)
H04W 52/34 (2009.01)

(52) U.S. Cl.
CPC ............ *H04L 67/10* (2013.01); *H04L 67/125* (2013.01); *H04L 67/42* (2013.01); *H04W 4/025* (2013.01); *H04W 52/283* (2013.01); *H04W 52/343* (2013.01); *H04W 52/367* (2013.01)

(58) Field of Classification Search
CPC ...................... H04W 72/042; H04W 723/0453
See application file for complete search history.

(56) References Cited

U.S. PATENT DOCUMENTS

| | | | | |
|---|---|---|---|---|
| 7,443,826 B1* | 10/2008 | Atarius | ................ | H04B 1/7087 370/342 |
| 2010/0265842 A1* | 10/2010 | Khandekar | ....... | H04W 72/0433 370/252 |
| 2011/0274074 A1* | 11/2011 | Lee | ........................ | H04L 5/0053 370/329 |
| 2012/0028668 A1* | 2/2012 | Lee | ........................ | H04L 5/0053 455/509 |
| 2012/0120858 A1* | 5/2012 | Das | ................... | H04W 52/0229 370/311 |
| 2013/0188552 A1* | 7/2013 | Kazmi | .................... | H04L 5/001 370/315 |
| 2013/0195051 A1* | 8/2013 | Koivisto | ................ | H04W 72/04 370/329 |
| 2013/0336189 A1* | 12/2013 | Mandil | ................. | H04L 12/189 370/312 |
| 2015/0039723 A1* | 2/2015 | Williams | .............. | H04W 40/02 709/217 |
| 2016/0128060 A1* | 5/2016 | Azarian Yazdi | .. | H04W 72/0446 370/336 |
| 2018/0006787 A1* | 1/2018 | Chen | ..................... | H04L 5/0051 |

* cited by examiner

Primary Examiner — Zhiren Qin

(57) ABSTRACT

A system for extending the range of a wireless signal is disclosed. A typical or near typical IP packet may be used to establish a connection between a server and a sending device. A server receives the payload of a packet for which delivery information has been removed. The server may package the data into a full IP packet and then communicate with a smart device, such as a door lock.

5 Claims, 10 Drawing Sheets

510

| Ver 511 | IHL 512 | Type 513 | Total Length 514 | |
|---|---|---|---|---|
| Identification 515 | | | Flags 516 | Fragment Offset 517 |
| Time To Live 518 | | Protocol 519 | Header Checksum 520 | |
| Source Address 521 | | | | |
| Destination Address 522 | | | | |
| Options 523 | | | | |
| Payload 524 | | | | |

630

| Destination Address 631 |
|---|
| Reduced Data 632 |
| Security Token 633 |

Fig. 6

CONTROLLING A REMOTE DEVICE OVER A NETWORK

CROSS-REFERENCE TO RELATED APPLICATIONS

This application claims the benefit as a Continuation-in-Part of, and incorporates by reference, U.S. patent application Ser. No. 15/198,384.

TECHNICAL FIELD

The disclosure relates generally to the field of communicating via a network with a device. Specifically, the disclosure relates to wireless communication with devices that have limited connectivity.

BACKGROUND

Wireless IoT communication is the cutting edge of modern consumer and commercial electronics. However, some significant roadblocks stand in the way of IoT ubiquity. In particular, the limited range of current protocols, such as Wi-Fi, Bluetooth, Z-Wave, and Zigbee, limit the applications of those networks, particularly in RF-noisy environments and applications that require long-range communication (which is further limited by government regulation). Additionally, different devices require different amounts of data to control those devices, and typical systems sacrifice range for speed. Thus, low-data devices are range limited by unnecessary data speed. This is especially the case for high-speed protocols such as Wi-Fi, Bluetooth and Zigbee. Another issue facing IoT networks is FCC regulation. The FCC limits power output, and most protocols transmit at maximum power levels, significantly beyond what is necessary to have a stable link, wasting power and unnecessarily reducing battery life. Yet another issue facing IoT networks is that processing an entire data packet to determine whether that information is intended for those devices results in unnecessary power drain and slower transmission speeds of data across the IoT networks. Additionally, FCC regulations may provide government-imposed limits such as the limit that the maximum transmitter output power, fed into the antenna, not exceed 30 dBm (1 watt) for unlicensed wireless equipment operating in the ISM band.

Some protocols, such as Z-wave, may address these issues by communicating on the low data 900 MHz ISM band, but are still significantly range-limited. For example, even when fully meshed, the range of a Z-wave network is only 160 meters which is limiting in many settings. Additionally, Z-wave and other similar protocols operate on a single frequency, and rely on time-division and other similar multiplexing to communicate with multiple devices. This makes these protocols especially susceptible to collisions and interference with other networks and devices, and requires additional data to secure communications, all of which increases the amount of data the needs to be transmitted and decreases range. The requirement for multiple hubs and/or devices to mesh and extend the network also increases costs associated with the network with only marginal improvements in range.

Other wireless networks, such as cellular networks, rely on large and expensive antenna arrays, with high power output and expensive high-gain receivers. Because of expense and regulatory limitations, such networks are not feasible for most, if not all, commercial IoT applications, and are certainly out of the question for private residential settings. Thus, despite efforts in the industry, significant problems still remain.

Other types of protocols which are used wireless communication include Bluetooth or Wi-Fi. Each protocol has its own range limitations. Additionally, many protocols such as Bluetooth or Wi-Fi require a two-way connection between a client and an access point. At times when the connection between a smart device, such as a Blue-tooth enabled furnace, and a host is lost, then the host will drop the smart device.

Various protocols are used for organizing information that is sent over a network; standard protocols allow for various devices to communicate with each other. For example, the IPX packet begins with a header which has the following fields and the number of bytes allocated for that field follows in parentheses: Checksum (2 bytes), Packet Length-including the IPX header (2 bytes), Transport Control, also known as hop count (1 byte), Packet Type (1 byte), Destination address (12 bytes), and Source address (12 bytes). The IPX packet protocol had limited data routing abilities and became disfavored with the rise of the Internet. IPX has been generally replaced by the TCP/IP protocol, which is used for exchanging data between a single network device and another network device. The User Datagram Protocol is a transport layer protocol on TCP/IP that is designed for broadcasting messages to multiple network devices.

TCP/IP consists mainly of TCP (Transmission Control Protocol) and IP (Internet Protocol). The IP protocol is used for addressing and routing packets between hosts. An IP packet consists of an IP header and an IP payload.

A datagram is a basic transfer associated with a packet-switched network. Typically, a datagram is structured to include a payload and a header. Datagrams provide two-way communication services across a packet switched network. The delivery, arrival time, and order of arrival of datagrams need not be guaranteed by the network.

A typical IP packet consists of the following IP headers: Source IP Address (the IP address of the original source of the IP datagram); Destination IP Address (the IP address of the final destination of the IP datagram); Identification (used to identify a specific IP datagram and to identify all fragments of a specific IP datagram if fragmentation occurs); Protocol (informs IP at the destination host whether to pass the packet up to TCP, UDP, ICMP, or other protocols); Checksum (a simple mathematical computation used to verify the integrity of the IP header); and Time-to-Live (designates the number of networks on which the datagram is allowed to travel before being discarded by a router; the TTL is set by the sending host and is used to prevent packets from endlessly circulating on an IP internetwork; when forwarding an IP packet, routers are required to decrease the TTL by at least one). See https://technet.microsoft.com/enus/library/cc958827.aspx.

The use of the TCP/IP protocol may result in cost issues as following the TCP/IP protocol can use up bandwidth and create bandwidth issues. The packet information that is part of the TCP/IP protocol may significantly increase total transmitted data in comparison to the users intend on communicating.

A protocol may examine a packet and handle information within the packet. In one example a network packet is embedded in another packet, such as "IP masquerading." When a packet is sent, an encapsulated packet is prepared and sent as the payload data. When the packet is received the payload data is removed and examined and the encapsulated packet is then sent over a network.

Control data is an inherent in the transport method. Control data is transmitted in addition to the actual data transmitted by user. The control data is removed when the data arrives. A protocol, such as the IP protocol, includes data to control the routing of the payload data.

In one example, the IP version 4 control data sends fourteen fields. These fields include a version, an internet header length, a differentiated service code point, and explicit Congestion Notification, a total packet length, an identification field, a number of flags, a fragment offset, a time to live, a protocol, a header checksum, a source address, a destination address, and a number of options.

Delivering a wireless communication over a distance is a known problem in the art. For example, the Bluetooth® wireless communication protocol is relatively short range, and some may use mesh nodes as repeaters in an attempt to extend the range of the Bluetooth® wireless communication protocol. Communications may be transmitted over as many as 20 mesh hops or more. Mesh nodes may allow the extension of a transmission area; however, the use of mesh nodes typically adds a cost overhead to retransmitting packets. Users generally set up the nodes to be in relatively close physical proximity to each other. When the transmission distance of the protocol is exceeded, mesh nodes may sever the proximity network and prevent communication. When expanding the distance of wireless transmission, such as to a barn that is remotely located from a residence, a preferred method in the art is to install a physical wire connection.

Additionally, after the attack on Sep. 11, 2001, builders are now more likely to use concrete cores; for example, modern skyscrapers may use thick concrete cores which obstructs wireless signals; in some instances, the builders may drill holes of 50 feet or longer and passing an Ethernet cable or other hardwire through thick building materials which obstruct wireless signals.

BRIEF SUMMARY

A method for controlling a device over a network is described. The method receives, from a control server on a virtual server, a reduced packet. The reduced packet includes instructions for altering the status of a remote device, such as instructing a Bluetooth®-enabled door lock to activate itself into the "on" state, and may or may not include a device identifier for the remote device. The reduced packet has between one and three elements, which are selected from the group of following elements: 1) a status code for a remote device, 2) a status code for a remote device and a device address, and a 3) security token. The device identifier for the remote device may be the typical device identifier used under standard protocols, such as TC/IP, Wi-Fi, or Bluetooth®; the device identifier for the remote device may also have a different format than standard protocols that may be shorter than the standard device identifier. The method may also include constructing, based on the reduced packet and removable data which may have been transferred previously to the virtual server during a "handshaking" process. The method sends, to the remote device such as a Wi-Fi enabled door lock or Bluetooth® enabled door lock, a network packet to set the state of the remote device into an on or off state; additional information may be transmitted which instructs the remote device to follow a schedule such as turn on in 2 hours for a period of 30 minutes. reduced packet; the method includes receiving, from the remote device, a response packet, the response packet consisting of data identifying the status of the remote device and data identifying the remote device; the method also includes constructing, based on the response packet and the removable data, a response network packet, the response network packet comprising data identifying the status of the remote device and identifying the remote device; and, sending the response network packet to the control server.

A device for communicating a request from a smart appliance to a control includes a processor, memory, communicatively connected to the processor; and a non-transitory data storage medium. The non-transitory data storage medium includes a number of modules. A communication receiving module receives, from a device, a communication packet. An adding module adds to the communication packet, networking data. The networking data controlling the transmission of the data to a device state server, to create a device state network packet. A transmitting module transmits, to the device state server, the device state network packet. A control receiving module to receive, from the device state server, a control packet. The control packet responds to the communication packet. A creating module creates, from the control packet, a device state change packet. The device state change packet consists of a reduction of the control packet. A sending module sends, to the device, the device state change packet to inform the device of a request to change state.

A computer program product for changing state on a device is described. The product includes a packet receiver, a device authenticator, a network packet receiver, a removable data identifier, a reduced packet sender, the packet receiver receiving, from a remote device, an authentication packet, the authentication packet identifying the device to a device control server; a device authenticator, the device authenticator authenticating, based on the authentication packet, the remote device; a network packet receiver, the network packet receiver receiving a network packet, the network packet including instructions for the remote device; a removable data identifier, the removable data identifier identifying, in the network packet, removable data, the removable data representing data that is to be removed from the network packet to create a reduced packet; a response network packet constructor, and a response packet sender. The reduced packet sender sends, to a remote device, a reduced packet. The reduced packet includes data from the network packet that may not be in the removable data. The response packet receiver receives, from the remote device, a response packet. The response packet includes data returned in response to the reduced packet. The response network packet constructor constructs, based on the response packet and the removable data, a response network packet. The response network packet includes data identifying the status of the remote device and identifying the remote device. The response packet sender sends the response network packet to a server.

BRIEF DESCRIPTION OF THE DRAWINGS

A more particular description of the invention briefly described above is made below by reference to specific example. Several examples are depicted in drawings included with this application. An example is presented to illustrate, but not restrict, the invention.

FIG. 6 illustrates a network packet and a reduced network packet as sent and received by a method for communicating with a device;

DETAILED DESCRIPTION

Figure 1:
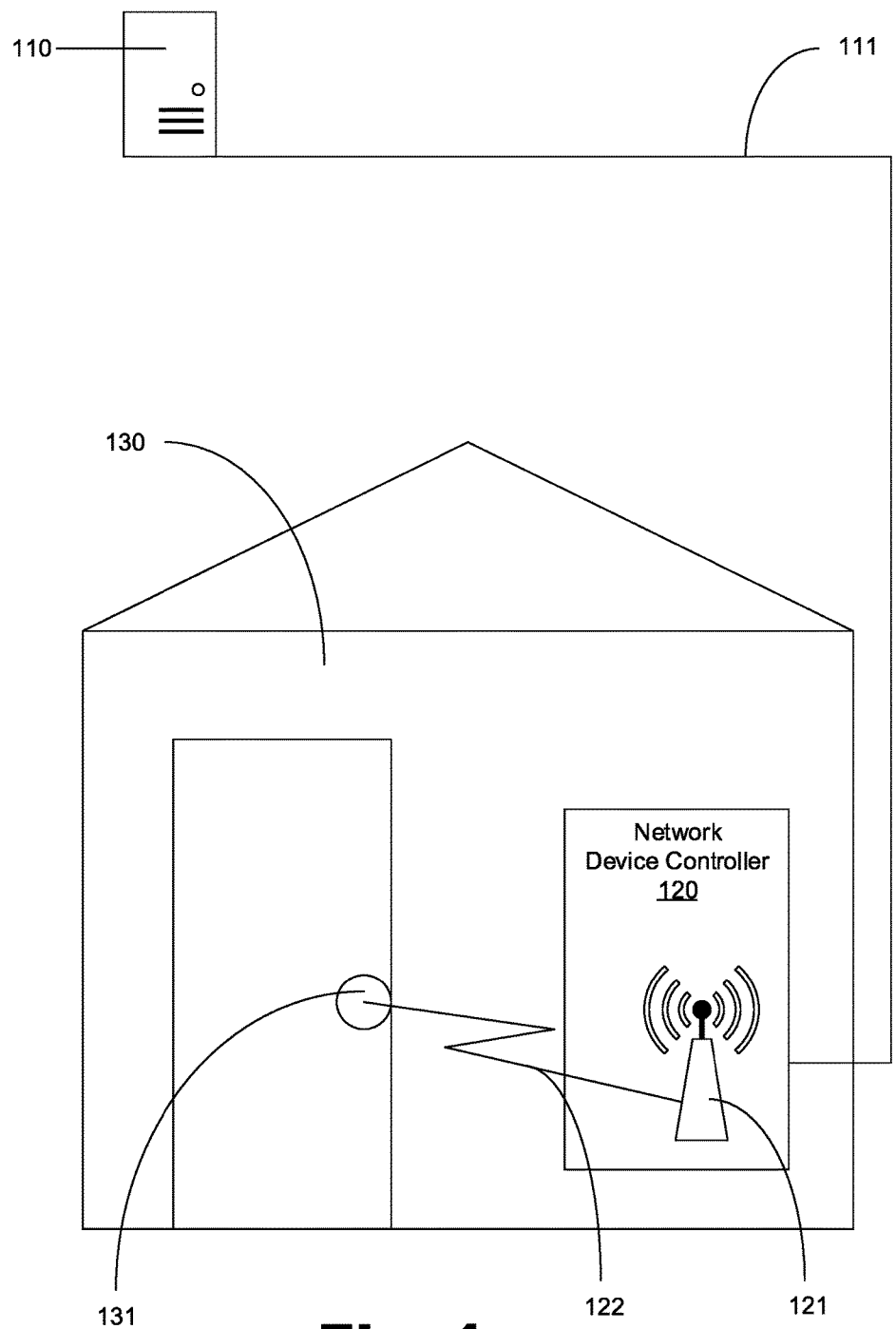
FIG. 1 illustrates an apparatus that communicates with a device data server and a household device.

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative examples of the invention, and is not intended to limit the scope of the invention as claimed.

In some instances, numerical values are used to describe features such as spreading factors, output power, bandwidths, link budgets, data rates, and distances. Though precise numbers are used, one of skill in the art recognizes that small variations the precisely stated values do not substantially alter the function of the feature being described. In some cases, a variation of up to 50% of the stated value does not alter the function of the feature. Thus, unless otherwise stated, precisely stated values should be read as the stated number, plus or minus a standard variation common and acceptable in the art.

For purposes of this disclosure, the modules refer to a combination of hardware and program instructions to perform a designated function. Each of the modules may include a processor and memory. The program instructions are stored in the memory and cause the processor to execute the designated function of the modules. Additionally, a smartphone app and a corresponding computer system for the smartphone app may be used to control the access control.

A purpose of the claimed method, system, and computer program product is to transfer from one networking protocol to or from a wireless networking protocol, such as any protocol used with Internet of Things ("IoT") including Bluetooth, ZigBee, Ethernet, WirelessHART, DigiMesh, ISA100.11a, IEEE 802.15.4, NFC, ANT, Eddystone, EnOcean, Wi-Fi, and WiMAX. The initial network packet, which may be the type of packet typically used to transmit information using standard protocols and include a header and a payload, may be reduced to create a reduced packet, or the system may generate a reduced packet directly from data without first generating the initial network packet. The reduced packet is smaller than a corresponding initial network packet—the reduced packet is the payload that remains after the header has been removed; various combinations of possible reduced packets exist and nonlimiting examples are to: a reduced packet that 1) only has an instruction for altering the status of a remote device, a device address, and a security token, 2) a reduced packet that only has an instruction for altering the status of a remote device and a remote device address; 3) and a reduced packet that only has an instruction for altering the status of a remote device. The reduced packet may be sent using a lower-bandwidth wires communication. A device implementing the method may be communicatively connected to a hub that connects to another computer network, such as the cloud. The device may be communicatively connected to an access control system. The method may be implemented as a part of another device, such as a wireless network router, an http router, or a general purpose computing device.

The method for communicating with a network device may be implemented by an apparatus that maintains a two-way connection. In one example access control is provided by approaching an enabled household device, such as a lock, and pressing a button. The button causes the household device to wake up and initiate contact with a wireless router implementing the method. The household device makes a connection to a network communication apparatus. The household device and the network communication apparatus negotiate to authenticate each other and transfer data. The state of both the household device and the network communication apparatus are in when the negotiation starts may influence the amount of time the authentication and data transfer takes.

With a device data server connected to the Wi-Fi router that implements a method, a two-way connection may be maintained. The device data server and Wi-Fi router that implements a method for communicating with a device. The device data server and the Wi-Fi router may communicate over a hardwired connection such as Ethernet, coaxial cable, or fiber optic cable. The device data server and the Wi-Fi router may communicate using a wireless protocol, such as 802.1(g), 802.1(n), or another wireless protocol.

Definitions

For purposes of this disclosure as used in the present specification and in the appended claims:

A "device list" is a list of one or more devices that are connected to or are authorized to be connected to a server; the device list may contain information about the devices such as device names, the protocols used to connect the devices, addresses, the status of the device, and other information; a device list may be in a data format that may be stored on a non-transitory storage medium.

A "household device" is an apparatus that may be used around a residential dwelling. A household device may be used in commercial settings to perform the same tasks as in a residential setting. A household device may be, but is not limited to, a lock, a door knob, a microwave oven, a slow cooker, and oven, a stove, a refrigerator, etc.

A "status code" is an instruction for altering the status of a remote device to a certain state, such as "on", "off", or "standby mode". Typically, a different status code is used to signify "on" from the status code which is used to signal "off".

"Unwrapping" is to perform a type of unencapsulation which means to start with a packet, such as an IP packet, and form a reduced packet by removing the payload data from the nonpayload data, which in the example of an IP packet would be Internet Protocol header data; unwrapping may be performed on any protocol used for transmitting data.

"Wrapping" is to perform a type of encapsulation which means combining nonpayload data, such as protocol header data like IP protocol header data for an IP packet, with payload data to form a network packet; wrapping may be performed on any protocol used for transmitting data.

Referring now to the figures, FIG. 1 illustrates an apparatus that communicates with a device data server and a household device. FIG. 1 illustrates a network device controller (120) uses a wireless connection (122) to communicate with a remote device (131). The network device controller (120) maintains communication (111) with a device data server (110). The network device controller (120) communicates and transforms information sent from the device data server (110) and the remote device (131). The network device controller (120) also communicates from the remote device (131) and the device data server (110). The network device controller (120) may communicate with a number of remote devices (131) using a wireless communication protocol (122) in a house (130) or business. The network device controller (120) communicates with the device data server (110) using a networking protocol (111).

The device data server (110) may identify, in a network packet, removable data. The removable data may include routing instructions used, at times, to move the network packet from the device data server (110) to the network device controller (120). The removable data may include unused protocol information in a networking header. The removable data may include a number of flags, counts, or other control information used by a networking protocol.

The device data server (110) may send to the network device controller (120) a reduced packet, with the ultimate destination being the remote device (131). In some embodiments, network device controller (120) may forward the reduced packet to the device; in the most preferred embodiments network device controller (120) constructs a network packet and sends the network patent to the remote device (131). The reduced packet may include data to operate the remote device (131). The reduced packet typically may contain less information than the network packet that was received from the device data server (110). The reduced packet may not have sufficient information to be routed, but may instead be communicated directly from the device data server (110) to the network controller (120).

The network device controller (120) may receive, from the remote device (131), a response packet. The response packet may return data to the device data server (110) in response to the network packet sent to the network device controller (130) and sent as the reduced packet.

The network device controller (120) constructs, based on the response packet and the removable data, a response network packet. The response packet may be derived to appear to the device data server (110) as though the network packet had been communicated from the device data server (110) to the remote device (131). The network device controller (120) may store removable data or data derived from removable data to construct the response packet. The response network packet comprising data identifying the status of the remote device and identifying the remote device. Network device controller (120) may communicate the response packet to device data server (110).

Figure 2:
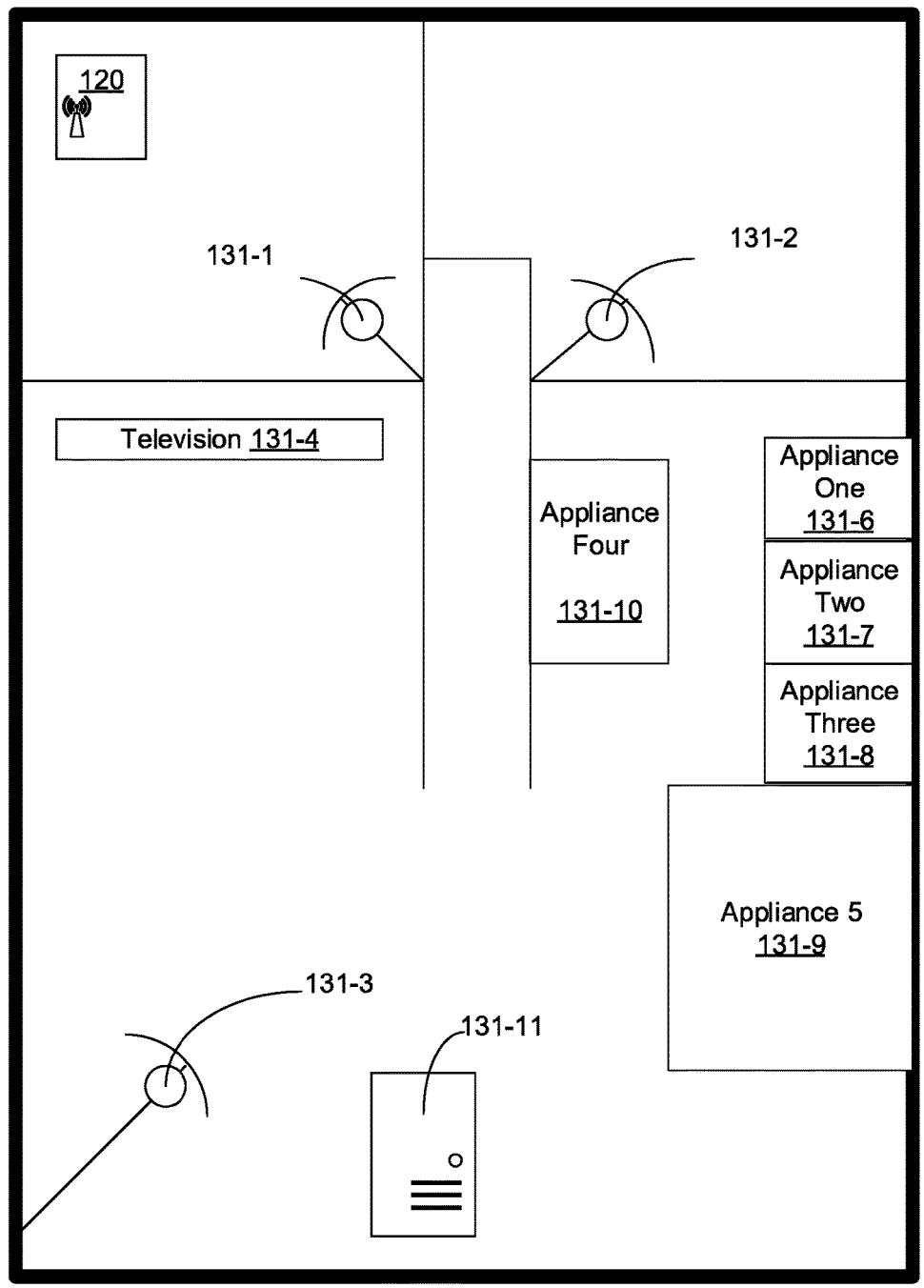
FIG. 2 illustrates an apparatus that communicates with a device data server and a household device.

FIG. 2 illustrates a number of remote devices (131) communicating with a device data server (FIG. 1, 110) through a network device controller (120). In this example, the network device controller (120) communicates at different times with different kinds of remote devices; however, in some embodiments network device controller (120) may communicate simultaneously with different devices. A remote device may perform an operation around a house such as those performed by door knob, a television, a refrigerator, an oven, a thermostat, a coffee maker, or other device. The remote devices (131) may communicate with the device data server (FIG. 1, 110) to allow centralized access, management and control. Each network device (131) may be a different distance away from the network device controller (120). Each remote device (131) may have a number of obstacles between it and the network device controller (120). Obstacles may be walls, space, other appliances, or other items that effect items that effect the propagation of radio waves or other forms of wireless communication.

As an example, the network device controller (120) may be closely located to a remote device (131-1). A standard wireless protocol may have adequate propagation to that device (131-1). A different device (131-11) may be further away from the network device controller. By using a different radio frequency, the wireless protocol may propagate to the different device (131-11). A different wireless protocol may have a lower bandwidth of data transmission.

A remote device (131) may be separated by a distance from the network device controller (120). Radio waves, or other forms of wireless communication, may be dissipate as they travel. This limits the distance that the radio waves are effective at communication.

A radio wave may travel further when transmitted using more energy. In one example, a half watt radio wave travels a distance A. In another example, a five-watt radio wave of the same frequency travels a longer distance, distance B. As power is increased to the output radio waves, the device transmitting the waves consumes additional power. A device may be designed to use less power for a number of reasons. One reason may be that the device runs on battery and by consuming less power, the battery life is extended. Another reason a device may consume less power may be so the increased power does not cause interference with other devices. Still another reason a device may consume less power may be to reduce the amount of energy the device consumes so as to reduce the environmental impact of the device operation.

Radio communication may be transmitted further using different antennae types. An antenna may provide gain to a signal, effectively allowing the signal to propagate further. An antenna may detect weaker signals, effectively receiving signals from further away. A particular type of antennae may not be desirable for a particular device due to space considerations. A particular type of antennae may not be desirable for a particular device due to the cost of construction of the antennae. A particular type of antennae may not be desirable for a particular device due to durability issues. A number of other factors may go in to the selection of an antennae for a particular device.

Figure 3:
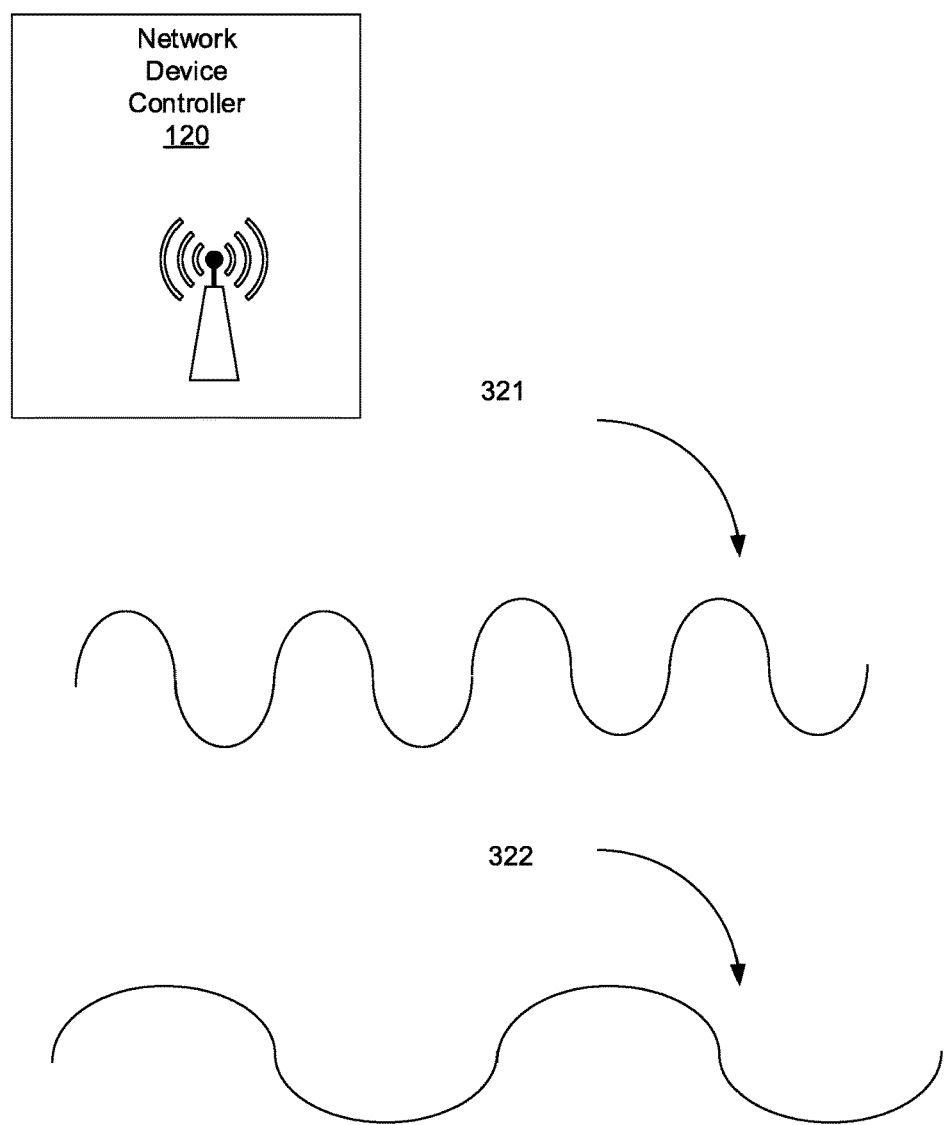
FIG. 3 illustrates a number of radio waves transmitted by an apparatus.

FIG. 3 illustrates a number of radio waves as may be transmitted by the network device controller (120). A first radio signal (321) may be compared to a second radio signal (322). The first radio signal (322) has a shorter wave length when compared to the second radio signal (322). It corresponds that the longer wavelength of the second radio signal (322) may have a lower frequency. In some instances, a lower frequency may carry less data than a higher frequency.

Figure 4:
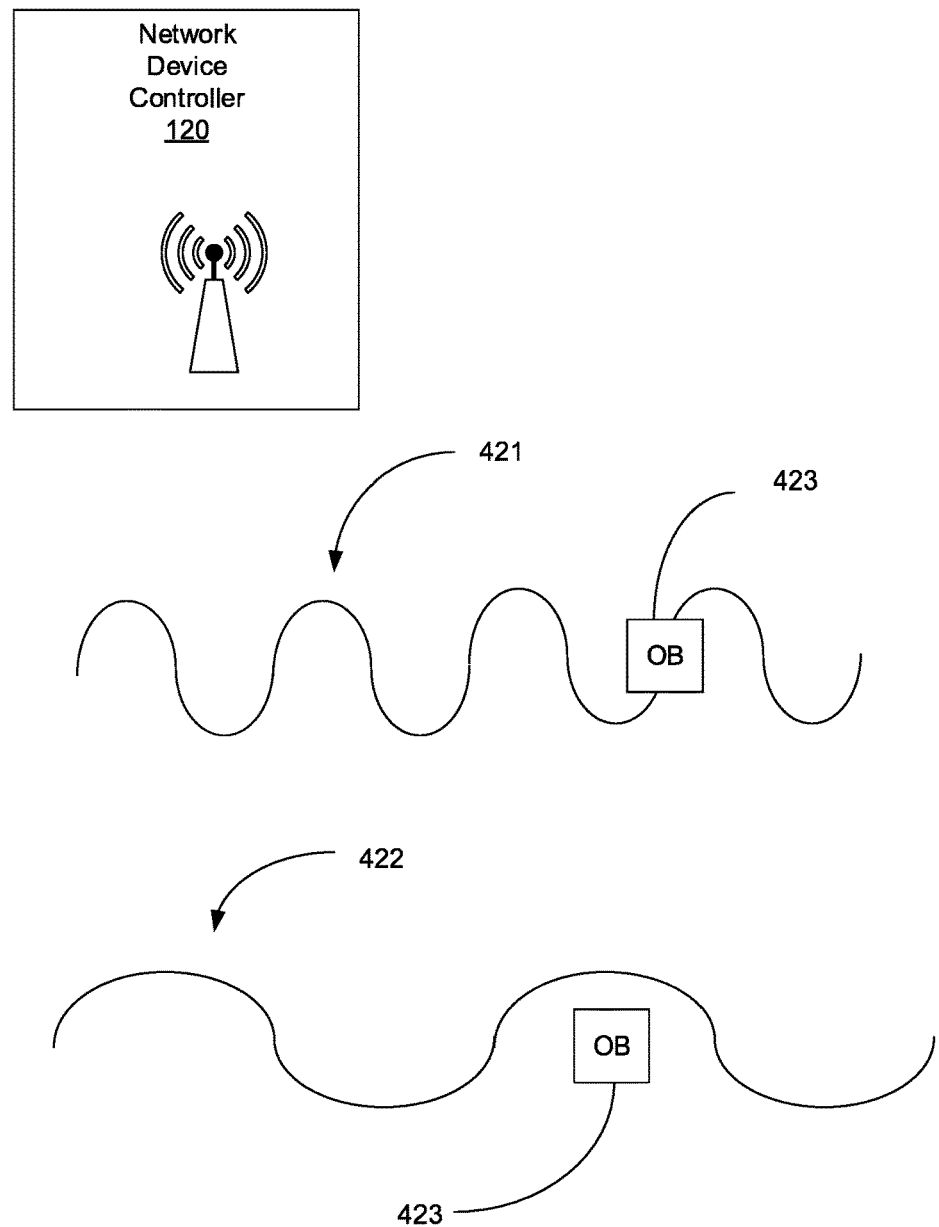
FIG. 4 illustrates a number of radio waves transmitted by an apparatus where the radio waves may be inhibited by environmental barriers.

FIG. 4 illustrates a number of radio waves as may be transmitted by the network device controller (120). A first radio signal (421) may be compared to a second radio signal (422). The first radio signal (422) has a shorter wave length when compared to the second radio signal (422). The radio signal with the longer wavelength (422) may avoid interference of various objects (423). The avoidance of interference with propagation may allow radio waves to propagate further without consuming additional power. The longer wave length and improved propagation comes at the cost of transmitting less data. When the network device controller (120) communicates with a remote device (FIG. 1, 131) the transmission may take longer or have more interference. A smaller packet may allow the data that may actually be used to be transmitted in the similar amounts of time as a packet transmitted using a networking protocol.

Figure 5:
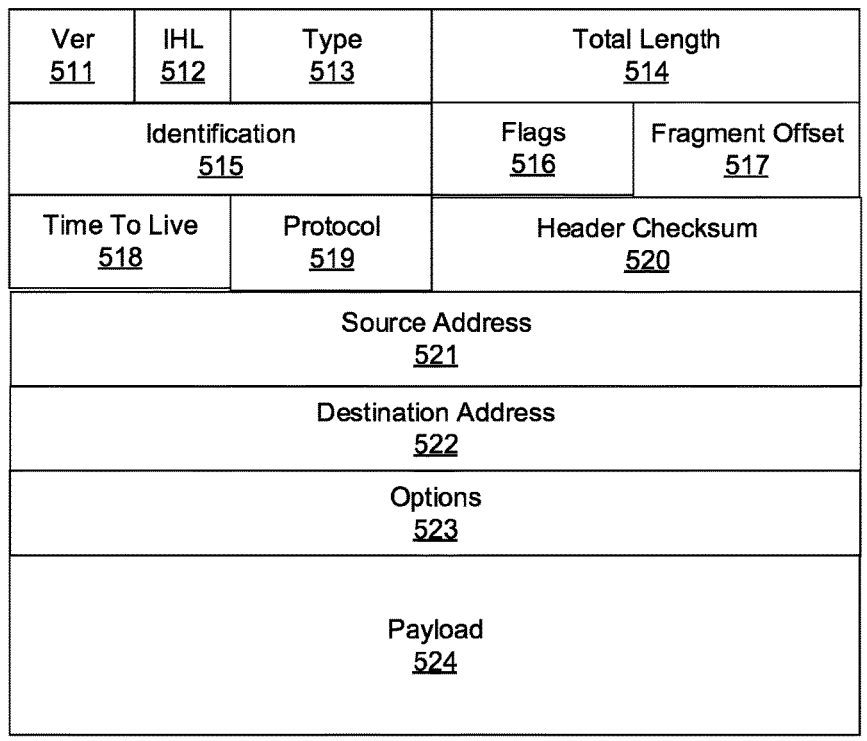
FIG. 5 illustrates a network packet and a reduced network packet as sent and received by a method for communicating with a device.
Figure 5:
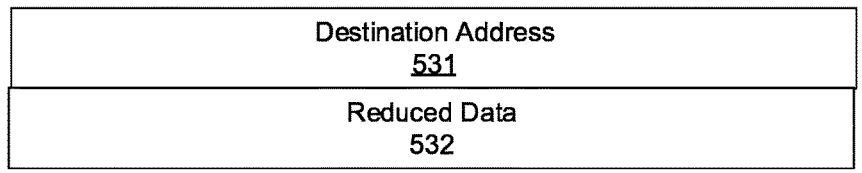

FIG. 5 illustrates a number of data packets as received or sent by the Network Device Controller (FIG. 120). The network packet (510) may be received over a computer network. In one example an Internet Protocol Version Four (IPv4) is depicted. In a different example, a different networking protocol may be received. The network packet (510) includes a version (511), an IHL (512), a type (513), a total length (514), an identification (515), a number of flags (516), a fragment offset (517), a time-to-live (518), a protocol flag (519), a header checksum (520), a source address (521), a destination address (522), a number of options, (523), and a payload (524). The payload (524) may represent the data a sender intends to send.

In one example, the network device controller (FIG. 1, 120) may optionally receive a network packet (510) from a device data server (FIG. 1, 110). The network packet (510) may include a payload (524) that is intended for a remote device (FIG. 1, 131). The network device controller (FIG. 1, 120) may then receive a reduced packet (530) that may have been transformed from network packet (510) by a device data server (FIG. 1, 110). The reduced packet (510) may include a destination address (531) and reduced data (532). The reduced packet (510) may include a security token of, for example, 16 bits, and data representing an instruction for a remote device, such as an instruction for the device to activate itself into the "on" state. In other embodiments, the reduced packet (510) may include 4 or less bytes or 4 less bits of data, which may include an instruction for the device to activates itself or be activated into a specific state. In other embodiments the reduced packet may include less than 65 bytes or less than 65 bits of data. The size of the reduced packet (510) is typically of a smaller size that the network packet (510). The smaller size of the reduced packet (530) may consume less bandwidth.

FIG. 6 illustrates a number of data packets as received or sent by the Network Device Controller (FIG. 1, 120). The network packet (510) may be received over a computer network. In one example an Internet Protocol Version Four (IPv4) is shown. In one example, the reduced packet (630) may include a destination address (631), reduced data (632), and a security token (633). The security token (633) may authenticate a remote device (FIG. 1, 131) and the network device control (FIG. 1, 120).

Figure 7:
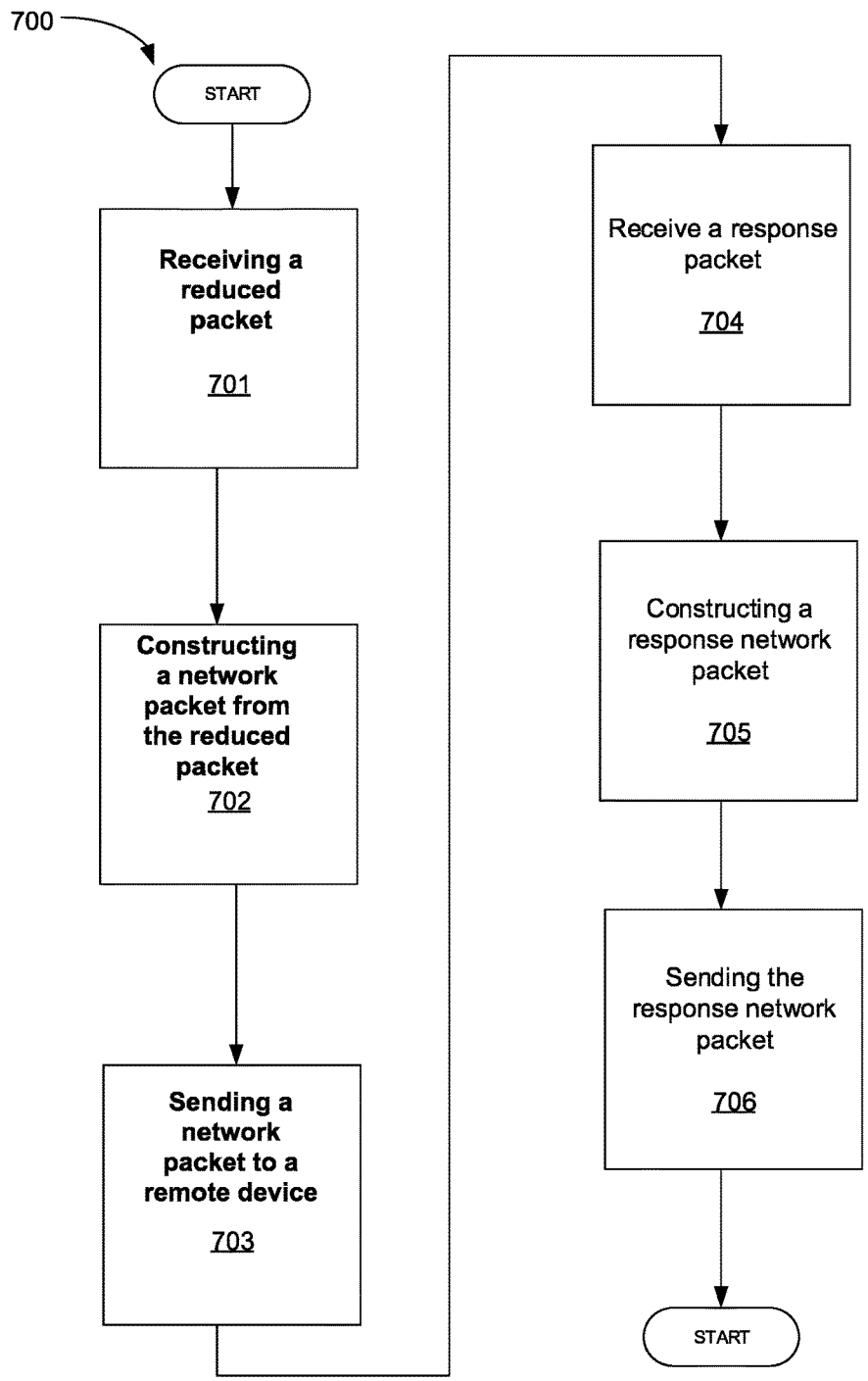
FIG. 7 illustrates an example of a method for controlling a device over a network.
Figure 8:
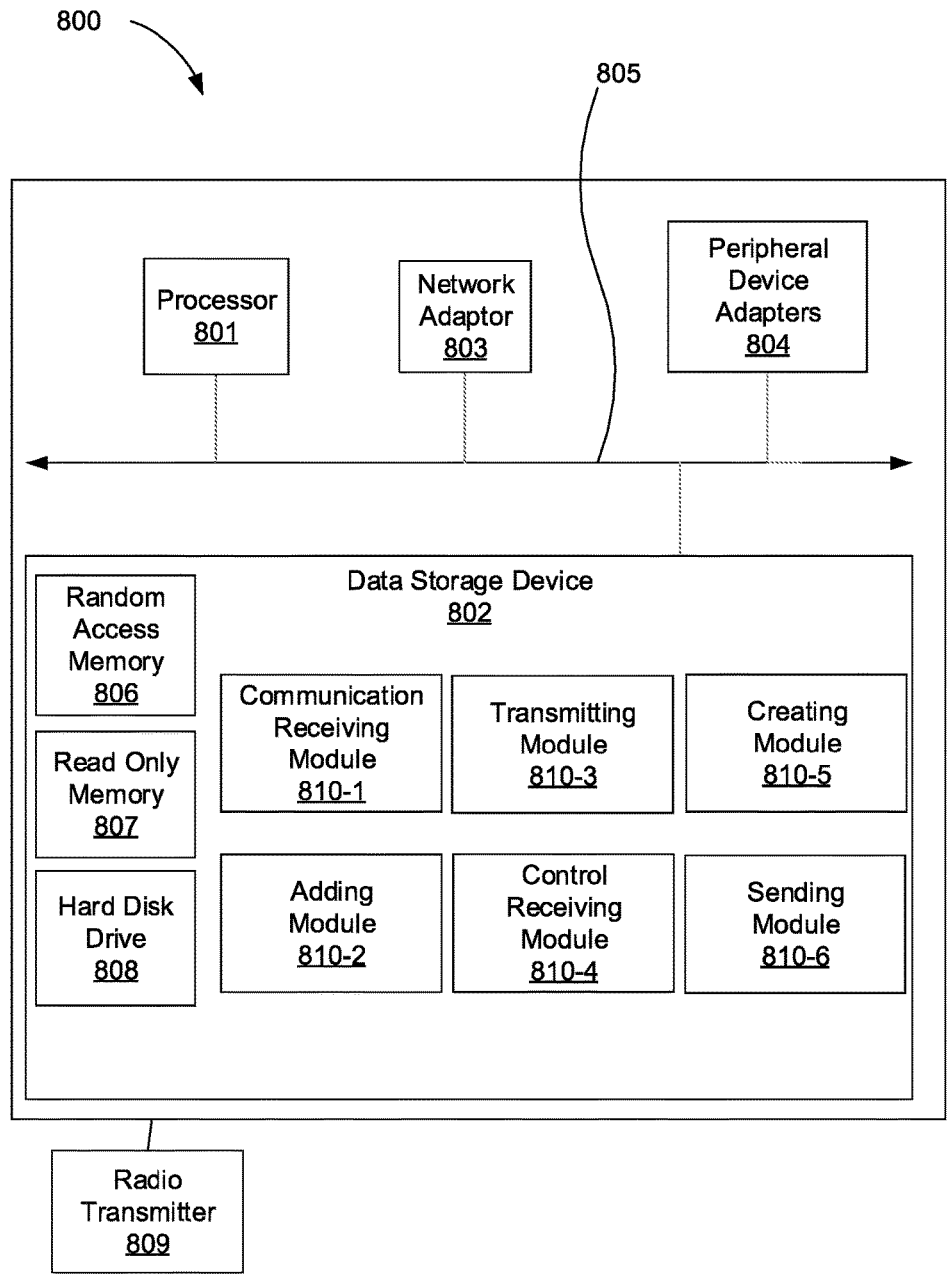
FIG. 8 illustrates an apparatus that communicates with a device data server and a household device.

FIG. 7 is a flow chart of a method implemented by a network device controller, according to one example of the principles described herein. The method (700) may be executed by the network device controller of FIG. 1. The method may be executed by other systems (i.e. system 800, system 900, system 1000). As illustrated, the method (700) may include receiving (block 701) at a network device controller (120) a reduced packet; constructing (block 702) the network packet from the reduced packet at network device controller (120); sending (block 703) the network packet to a remote device; and constructing; sending (block 704) the network packet to a remote device, receiving (block 705) a response packet (which may be a full network packet or a reduced packet as described herein), at the network device controller (120), from the remote device, and optionally constructing a response network packet (which may contain a smaller packet, which remains or is derived, of data that has been removed from the network packet or may be a full network packet which may not need to be constructed but may need to be relayed) and sending (block 706) the response network packet to the device data server, which may be referred to as the control server (FIG. 1, 110), In a preferred embodiment, method (700) receives (block 701) from a control server (FIG. 1, 110) on a virtual server, in which the control server (110) reduces an initial network packet (FIG. 5, 530), the initial network packet comprising device operating instructions and routing instructions for a remote device, to a reduced packet by removing routing instructions to leave, what may be a modified device indicator or a typical device indicator, and (FIG. 1, 131); in some preferred embodiments the reduced packet is constructed directly without the removal of data from an initial network packet;

In a preferred embodiment, the method (700) includes identifying, at the device data server (110) from the network packet (FIG. 1, 110), removable data. The removable data may include routing instructions, such as the time-to-live field (FIG. 5, 518).

In a preferred embodiment, the method (700) sends (block 703), to the remote device, a network packet (FIG. 5, 530) or (630). The reduced packet may include data other than the removable data. The reduced packet may smaller than the network packet (FIG. 5, 510) and may contain a subset of the data in the network packet (FIG. 5, 510). The reduced packet may set a state in the remote device (FIG. 1, 131). The reduced packet may cause the remote device (FIG. 1, 131) to identify itself. The reduced packet may include a subset of data from the network packet. The data in the reduced packet may be derived from the data in the network packet.

In a preferred embodiment, the method (700) receives (block 704) from the remote device (FIG. 1, 131), a response packet. The response packet may include data returned in response to the reduced packet. The response packet may be in the same or similar format as the reduced packet (FIG. 5, 530).

In a preferred embodiment, the method (700) constructs, based on the response packet and the removable data, a response network packet. The response network packet may include data identifying the status of the remote device and identifying the remote device, may be a reduced packet, or may be a full network packet. The response packet may appear to the control server (FIG. 1, 130) as having originated at the remote device (FIG. 1, 131).

In a preferred embodiment, the method (700) sends (706) the response network packet to the control server. The response network packet may indicate to the control server the result of the operation on the remote device (FIG. 1, 131).

An overall non-limiting example according to FIG. 7 will now be given. A network packet (FIG. 6, 510) may be sent from a device data server (FIG. 1, 110) to a remote device (FIG. 1, 131). In this example, the remote device (FIG. 1, 131) is a door knob. The network packet (FIG. 6, 510) directs the remote device (FIG. 1,131) to change to an unlock state. The response packet from the remote device may be useful informing the servers that the door lock has been moved to the unlocked state. In a preferred embodiment, the method (700) receives (701) the initial packet (FIG. 6, 510)

In a preferred embodiment, the method (700) identifies (block 702), in the network packet (FIG. 6, 510), removable data. In a preferred embodiment, the method (700) identifies that the network packet (FIG. 6, 510) is using Internet Protocol Version Four (IPV4). In a preferred embodiment, the method identifies that the version (FIG. 6, 511), the IHL (FIG. 6, 512), the type (FIG. 6, 513), the total length (FIG. 6, 514), the identification (FIG. 6, 515), the number of flags (FIG. 6, 516), the fragment offset (FIG. 6, 517), the time-to-live (FIG. 6, 518), the protocol flag (FIG. 6, 519), the header checksum (FIG. 520), the source address (FIG. 6, 521), and the number of options, (FIG. 6, 523) may be removed. The destination address (FIG. 6, 521), the payload (FIG. 6, 524), and a security key may be used to create a reduced packet (FIG. 6, 630) that may be transmitted to the remote device (FIG. 1,131).

In a preferred embodiment, the method (700) sends (block 703) the reduced packet (FIG. 6, 630) to the remote device (FIG. 1, 131). In a preferred embodiment the method sends a network packet to the remote device.

In a preferred embodiment, the method (700) receives (block 704) from the remote device (FIG. 1, 131), a response packet. The response packet may be in the same or similar format as the reduced packet (FIG. 6, 630) and may specify the remote device controller (FIG. 1, 121) as the destination address.

In a preferred embodiment, the method (700) constructs (block 705), based on the response packet and the removable data, a response network packet. The response network packet may include data identifying the status of the remote device and identifying the remote device. The response packet may appear to the control server (FIG. 1, 130) as having originated at the remote device (FIG. 1, 131). The response packet may include a version (FIG. 6, 511), an IHL (FIG. 6, 512), a type (FIG. 6, 513), a total length (FIG. 6, 514), an identification (FIG. 6, 515), a number of flags (FIG. 6, 516), a fragment offset (FIG. 6, 517), a time-to-live (FIG. 6, 518), a protocol flag (FIG. 6, 519), a header checksum (FIG. 520), a source address (FIG. 6, 521), and a number of options, (FIG. 6, 523). The added fields may enable a networking protocol to send the data from the remote device (FIG. 1, 131) to the device data server (FIG. 1, 110).

In a preferred embodiment, the method (700) sends (706) the response network packet to the device data server.

The computing device (800) may be utilized in any data-processing scenario, including stand-alone hardware, mobile applications, a computing network, or combinations thereof. Further, the computing device (800) may be used in a computing network, a public cloud network, a private cloud network, a hybrid cloud network, other forms of networks, or combinations thereof. In one example, the methods provided by the computing device (800) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (800) are executed by a local administrator.

To achieve its desired functionality, the computing device (800) may include various hardware components. Among these hardware components may be a number of processors (801), a data storage device (802), a number of peripheral adapters (804), and a number of network adapters (803). These hardware components may be interconnected through the use of a number of buses and/or network connections. In one example, the processor (801), data storage device (802), peripheral device adapters (804), and network adapter (803) may be communicatively coupled via a bus (805).

The computing device (800) may include various types of memory modules, including volatile and nonvolatile memory. For example, the data storage device (802) may include Random Access Memory (RAM) (606), Read Only Memory (ROM) (607), and Hard Disk Drive (HDD) memory (808). Many other types of memory may also be utilized, and the present specification contemplates the use of as many varying types) of memory in the computing device (800) as may suit a particular application of the principles described herein. In other examples, different types of memory in the computing device (800) may be used for different data storage needs. In some examples, the processor (801) may boot from Read Only Memory (ROM) (807), maintain nonvolatile storage in the Hard Disk Drive (HDD) memory (808), and execute program code stored in Random Access Memory (RAM) (806).

Generally, the computing device (800) may comprise a computer readable medium, a computer readable storage medium, or a non-transitory computer readable medium, among others. For example, the computing device (800) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (803, 804) in the computing device (800) enable the processor (801) to interface with various other hardware elements, external and internal to the computing device (800). The peripheral device adapters (804) may provide an interface to input/output devices, such as a radio transmitter (809), to communicate with a remote device. The peripheral device adapters (803) may also provide access to other external devices, such as an external storage device, a number of network devices, such as servers, switches, and routers, client devices, other types of computing devices, or combinations thereof.

The radio transmitter device (809) may be provided to allow the computing device (800) to interact with a remote device (FIG. 1, 131). The peripheral device adapters (804) may create an interface between the processor (801) and the radio transmitter (809), a printer, or other media output devices. The network adapter (803) may provide an interface to other computing devices within, for example, a network, thereby enabling the transmission of data between a communication receiving module to receive, from a device, a communication packet;

The communication receiving module (810-1) may receive, from a device, a communication packet. The communication packet may originate from a remote device (FIG. 1, 131). The communication packet may not include networking information that would be used to transmit the communication packet to the device data server (FIG. 1, 110).

The adding module (810-2) may add, to the communication packet, networking data to create a device state network packet. The networking data may control the transmission of the data to a device state server. The networking data may allow for the data in the communication packet to be sent to the device data server (FIG. 1, 110) using common networking protocols.

The transmitting module (810-3) may transmit, to the device state server, the device state network packet. The device state network packet may inform the device data server (FIG. 1, 110) of the state of the remote device (FIG. 1, 131). The device state network packet may inform the device data server (FIG. 1, 110) of the state of the remote device. The device state network packet may inform the device data server (FIG. 1, 110) of a desired state change. The device state network packet may include security information, such as a passcode or user identifier, to determine if a state change is permitted.

The control receiving module (810-4) may receive, from the device state server (FIG. 1, 110), a control packet. The control packet may respond to the communication packet. The control packet may inform the remote device (FIG. 1, 131) of a new state or operation to perform.

The creating module (810-5) may create, from the control packet, a device state change packet. The device state change packet may include a reduction of the control packet. The network device controller (FIG. 1, 120) may remove networking data to create a device state change packet. The network device controller (FIG. 1, 120) may derive data for the device state change packet using the control packet.

The sending module (810-6) may send, to the device, the device state change packet. The device state change packet may inform the device of a request to change state. The smaller device state change packet consumes less bandwidth than the control packet. The lower bandwidth consumption facilitates the use of lower throughput communication protocols, such as lower frequency radio waves.

Figure 9:
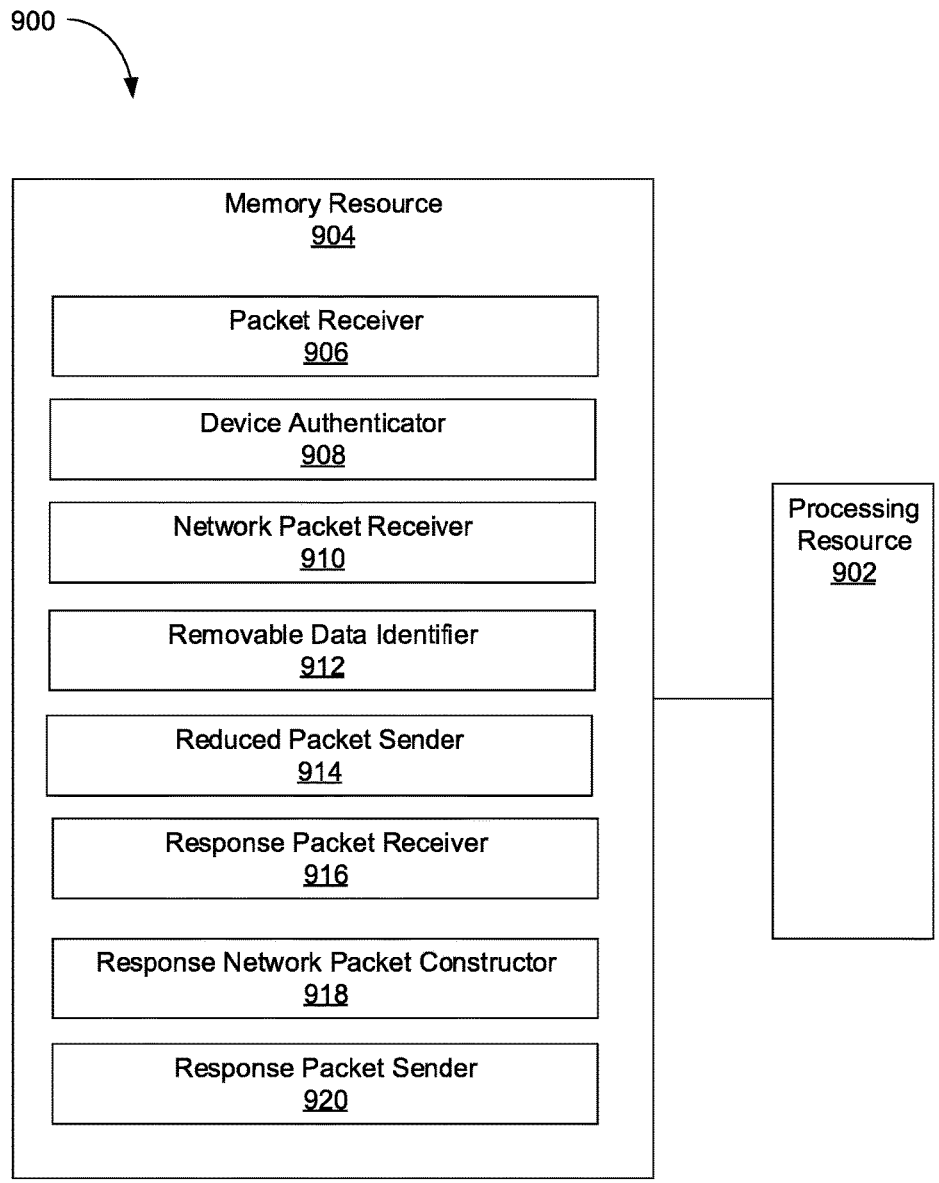
FIG. 9. illustrates a computer program product for communicating with a device data server and a household device.

FIG. 9 is a diagram of a remote device controlling system (900) according to one example of the principles described herein. The remote device controlling system (900) includes processing resources (902) that are in communication with memory resources (904). The processing resources (902) include at least one processor and other resources used to process programmed instructions. The memory resources (904) generally represent any memory capable of storing data, such as programmed instructions or data structures to be used by the remote device controlling system (900). The programmed instructions shown stored in the memory resource (904) include a packet receiver (906), a device authenticator (908), a network packet receiver (910), a removable data identifier (912), a reduced packet sender (914), a response packet receiver (916), a response network packet constructor (918) and a response packet sender (920).

The packet receiver (906) represents programmed instructions that, when executed, cause the processing resource (902) to receive, from a remote device, an authentication packet. The authentication packet identifies the device to a device control server.

The device authenticator (908), represents programmed instructions that, when executed, cause the processing resource (902) to authenticate, based on the authentication packet, the remote device.

The network packet receiver (910), represents programmed instructions that, when executed, cause the processing resource (902) to receive a network packet. The network packet includes instructions for the remote device.

The removable data identifier (912), represents programmed instructions that, when executed, cause the processing resource (902) to identify, in the network packet, removable data. The removable data represents data that is to be removed from the network packet to create a reduced packet.

The reduced packet sender (914), represents programmed instructions that, when executed, cause the processing resource (902) to send, to the remote device, the reduced packet. The reduced packet includes data from the network packet that is not in the removable data.

The response packet receiver (916), represents programmed instructions that, when executed, cause the processing resource (902) to receive, from the remote device, a response packet. The response packet includes data returned in response to the reduced packet.

The response network packet constructor (918), represents programmed instructions that, when executed, cause the processing resource (902) to construct, based on the response packet and the removable data, a response network packet. The response network packet includes data to identify the status of the remote device and to identify the remote device;

The response packet sender (920), represents programmed instructions that, when executed, cause the processing resource (902) to send the response network packet to a server.

Figure 10:
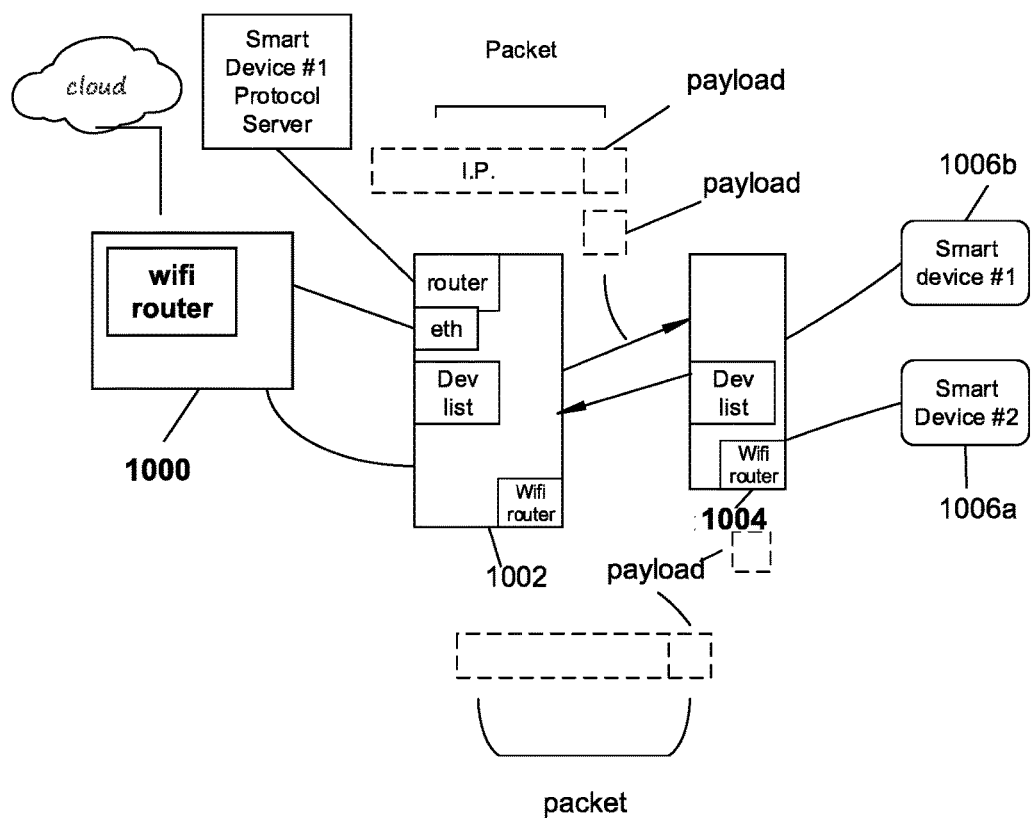
FIG. 10. illustrates a system including an apparatus for communicating with a device data server and a household device.

Referring now to FIG. 10, a server (1000) is depicted. Server (1000) may include a Wi-Fi router and other types of routers. Server (1000) may be connected to the cloud. Server (1000) may also be connected with a client (1002). The client (1002) may be a computer system that includes a Wi-Fi router, a device list, an Ethernet router or port for connecting to a Wi-Fi router of a server or other device, and one or more routers for connecting to a server using a protocol such as Bluetooth®. Client (1002) may be configured to perform a type of unencapsulation referred to herein as "unwrapping" which means to take a packet, such as an IP packet, and form a reduced packet by removing the payload data from the nonpayload data, which in the example of an IP packet would be Internet Protocol header data; client (1002) may then transmit the payload to a remote second server. Use of data unwrapping and then a corresponding data "wrapping", which is a form of encapsulation in which nonpayload data is added to payload data to form a network packet, may be used so that client (1002) may communicate, or communicate on a more consistent basis, with server (1002) at a longer range than is typically used, such as over 0.5 miles or even over 0.9 miles. The remote server (1004) may have a device list, a Wi-Fi router, and other routers for communicating with devices using different protocols other than Wi-Fi. The communication between the client (1002) and the remote server (1004) may be more typical at times to allow "handshaking" between the client (1002) and the remote server (1004) to establish a connection. Server (1004) may be configured to identify the payload that is sent by client (1002) and determine for which smart device the payload is intended. Server (1004) may be a virtual replica of some or all of the client (1002). Server (1004) may send the payload, which may be a shortened version of what is sent using typical protocols such as the IP protocol, to a smart device (1006b, 1006a); it may also encapsulate the payload, such as converting the payload into a network packet by adding back in a header with routing information. At times a more secure method may be used where a security token is transmitted. Server (1004) may then send the device command to a smart device (1006a) such as a Bluetooth®-enable device, such as a door lock, connected to server (1004) via an appropriate router, such as a Bluetooth® router. Server (1004) may be connected to multiple devices using multiple protocols and it may have a device list, as well as server (1002). Server (1002) may also be a client. A reduced packet may be under 200 bytes or bits, may be under 65 bits or bytes, may include 16-bit encryption, may be as small as a single bit which encodes information for instructing a remote device to change state.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. A device for communicating a request from a smart appliance to a control server, the device comprising:
   a processor;
   memory, communicatively connected to the processor; and
   a non-transitory data storage medium, the non-transitory data storage medium storing instructions that are executable by the processor to:
      receive, from a remote device, a communication packet;
      add first header information to the communication packet to create a device state network packet, the first header information comprising networking data, the networking data controlling the transmission of the device state network packet to a device state server;
      transmit, to the device state server, the device state network packet;
      receive, from the device state server, a control packet, the control packet responding to the device state network packet;
      remove second header information from the control packet to create a device state change packet; and
      send, to the remote device, the device state change packet to inform the remote device of a request to change state to a new state.

2. The device in claim 1, wherein the networking data includes an identification of the device state server.

3. The device of claim 1, wherein the first header information comprises authentication data, the authentication data identifying the remote device to the device state server.

4. The device of claim 1, wherein the device state change packet comprises a time length for the remote device to remain in the new state.

5. The device of claim 1, wherein the device state change packet comprises a delay indicator, the delay indicator indicating a time the remote device is to change state.

* * * * *